United States Patent [19]

Bauer et al.

[11] Patent Number: 5,091,070

[45] Date of Patent: Feb. 25, 1992

[54] METHOD OF CONTINUOUSLY REMOVING AND OBTAINING ETHYLENE DIAMINE TETRACETIC ACID (EDTA) FROM THE PROCESS WATER OF ELECTROLESS COPPER PLATING

[75] Inventors: Bernd Bauer, Stuttgart; Wolfgang Erlmann, Herrenberg, both of Fed. Rep. of Germany

[73] Assignee: International Business Machines Corporation, Armonk, N.Y.

[21] Appl. No.: 575,264

[22] Filed: Aug. 30, 1990

[30] Foreign Application Priority Data

Sep. 1, 1989 [DE] Fed. Rep. of Germany ....... 3929137

[51] Int. Cl.$^5$ .............................................. B01D 13/02
[52] U.S. Cl. ................................. 204/182.4; 204/151; 204/301; 204/DIG. 13
[58] Field of Search ...................... 204/182.4, 151, 301, 204/DIG. 13

[56] References Cited

U.S. PATENT DOCUMENTS

| | | | |
|---|---|---|---|
| 4,289,597 | 9/1981 | Grenda | 204/182.4 |
| 4,324,629 | 4/1982 | Oka et al. | 204/130 |
| 4,425,205 | 1/1984 | Honma et al. | 204/DIG. 13 |
| 4,549,946 | 10/1985 | Horn | 204/182.4 |
| 4,552,635 | 11/1985 | Jenczewski et al. | 204/182.4 |
| 4,600,493 | 7/1986 | Korngold | 204/DIG. 13 |
| 4,615,780 | 10/1986 | Walker | 204/182.4 |
| 4,629,545 | 12/1986 | Mani et al. | 204/182.4 |
| 4,680,098 | 7/1987 | Chang | 204/182.4 |
| 4,839,056 | 6/1989 | Cahn | 210/643 |
| 4,909,916 | 3/1990 | Koberstein et al. | 204/182.6 |
| 5,006,211 | 4/1991 | Paleologou et al. | 204/182.4 |

Primary Examiner—John Niebling
Assistant Examiner—Arun S. Phasge
Attorney, Agent, or Firm—Judith D. Olsen

[57] ABSTRACT

The invention relates to a method of continuously removing and obtaining ethylene diamine tetracetic acid (EDTA) from the process water of electroless copper plating. For that purpose the process water containing the EDTA is directed into an electrodialysis cell alternatingly equipped with bipolar membranes and anion exchange membranes and/or cation exchange membranes, and to which a potential difference is applied. The EDTA is converted into its charge-neutral form by means of protonation, and the protons required for that purpose are generated via bipolar membranes through electrodialysis. The required pH-value is adjusted by a pH-controlled electric field regulation via the bipolar membranes.

11 Claims, 5 Drawing Sheets

METHOD OF CONTINUOUSLY REMOVING AND OBTAINING ETHYLENE DIAMINE TETRACETIC ACID (EDTA) FROM THE PROCESS WATER OF ELECTROLESS COPPER PLATING

DESCRIPTION

The invention relates to a method of continuously removing and obtaining ethylene diamine tetraacetic acid (EDTA) from the process water of electroless copper plating, and to devices for carrying out this method.

In the production of printed circuit boards it is frequently necessary to resort to a chemical reaction for the deposition of copper. The most important components of these so-called electroless copper plating baths, apart from copper-sulphate and sodium hydroxide, are a reducing agent, preferably formaldehyde, and ethylene diamine tetraacetic acid (EDTA) as a complexing agent. As the effectiveness of the reducing agent is usually highly increased with high pH-values, the concentrations for EDTA have to be very high to prevent the precipitation of copper hydroxide. In this process, the EDTA is not chemically modified and therefore not used up during the process. For economic and environmental reasons the EDTA has therefore to be removed and recovered from the process water.

During conventional electroless copper deposition, the following reaction takes place in the plating bath:

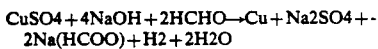

$$CuSO_4 + 4NaOH + 2HCHO \rightarrow Cu + Na_2SO_4 + 2Na(HCOO) + H_2 + 2H_2O$$

Beside the rapid consumption of copper sulphate, formaldehyde and sodium hydroxide the quality of the copper deposition is negatively affected by the parallel enrichment of the plating bath with sodium sulphate and sodium formate. The resulting reduction of the bath retention times is counteracted by continuous disposal of the product substances with a simultaneous addition of consumption substances. It is e.g. known from DE-PS 3,022,962 to regenerate chemical copper plating solutions in that the counter-ions for the copper ions and the ions formed by the oxidation of the reducing agents and inhibiting the plating process are removed by electrodialysis.

These methods, however, were not accepted in practical use as they either did not achieve a "steady state" over extended test periods, or because the material available does not have retention times sufficient in relation to the aggressive medium of the copper bath. To give an example: the direct electrodialytical separation of the inhibitors produced failed due to the insufficient alkali resistance of the commercially available anion exchange membranes.

As a consequence, electroless copper plating baths have in practical use to be operated with a continuous overflow which just equals the volume extension owing to a replenishing of the educts. Since after their removal from the bath the plated printed circuit boards are cleaned with fully desalted water this rinsing water can be added to the overflow solution. The result is a solution which apart from sodium sulphate and sodium formate contains traces of formaldehyde and in particular large quantities of copper-EDTA. For reasons of economy, and especially in view of the disposal problems involved all environment-relevant components will have to be separated completely. As copper can be completely removed electroltyically, with the formaldehyde simultaneously oxidizing into sodium formate, the disposal problems involved with the separation of the EDTA are considerable.

According to one method, EDTA-containing solutions are disposed of by decomposing the EDTA. Such decomposition can be effected by chemical or anodic oxidation. However, these processes involve high costs for the chemicals or the energy required. Furthermore, it is technically quite complicated to their effects on the environment only unharmful and non-toxic decomposition products are formed, with this question becoming particularly relevant in those cases where under the emission rates fixed by the legislation EDTA is to be disposed into sewage.

Another disadvantage of these decomposition reactions is the continuous EDTA consumption. As EDTA acts as a complexing agent exclusively and is thus not used up, its recycling is desirable in any case. Such recycling is achieved by separating the charge-neutral EDTA. For that purpose, by means of an electrolysis at pH-values around 13 the complexed copper is separated from the solution, and simultaneously the EDTA is set free from the complex. In a second reaction, the formaldehyde is oxidized to formic acid. Subsequently, by admixing strong mineral acids, e.g. sulphuric acid a pH-value of 1.7 has to be set to precipitate the charge-neutral EDTA. The supernatant liquid containing up to 1,500 ppm EDTA is separated, neutralized with sodium hydroxide and directed to an evaporation system. The thus obtained neutral salt mainly contains sodium sulphate from the precipitation and neutralization process, and only about 2% Na2EDTA. This low complexing agent percentage, however, requires declaration and storage as special waste.

It is therefore the object of the present invention to provide a method by means of which EDTA is removed and extracted from the process water of electroless copper plating substantially continuously, and if possible without further auxiliary substances, and by which re-use is made possible. It is furthermore the object of the present invention to provide devices for implementing the method as disclosed by the invention.

This object is achieved in that the EDTA-containing process water is directed into an electrodialysis cell (EDZ1) to which a potential difference has been applied and which is alternatingly equipped with bipolar membranes and anion exchange membranes and/or cation exchange membranes, that the EDTA in the electrodialysis cell (EDZ1) is converted into the charge-neutral form, that the protons required for that purpose are generated via bipolar membranes by means of electrodialysis, and that the pH-value is adjusted by a pH-controlled electric field regulation via the bipolar membranes.

The advantage of the method as disclosed by the invention consists in that the protons required for converting the EDTA into the uncharged state are not added via mineral acids—and therefore with additional anionas—but via an electrodialytical water dissociation by means of bipolar membranes, with the necessary pH-value for protonation being set through a pH-controlled electric field regulation via the bipolar membranes, thus avoiding a pH drifting, so that the method as disclosed by the present invention may be continuously implemented with optimum pH-values.

In order to separate the still present EDTA (in the order of 1,000 ppm) in the remaining fluid from the other present ions the fluid is advantageously directed through a second electrodialysis cell (EDZ2) alternatingly equipped with ion and cation exchange membranes. With an optimum pH-value of 1.7 there is in the electrodialysis a transport of sulphate and formate ions into the so-called concentrate cycle, while the EDTA remains in the diluate cycle and is concentrated there, which causes further EDTA precipitation. The use of the electrodialysis cell EDZ2 is possible wihtout the previous use of electrodialysis cell EDZ1, by effecting protonation through acidification with a mineral acid, preferably with sulphuric acid which, as pointed out above, brings less favorable results but is less complex from an apparatus point of view. In portonation, the pH-value is preferably lowered to a value between 0l9 and 2.2, 1.7 being the best value.

Figure 1:
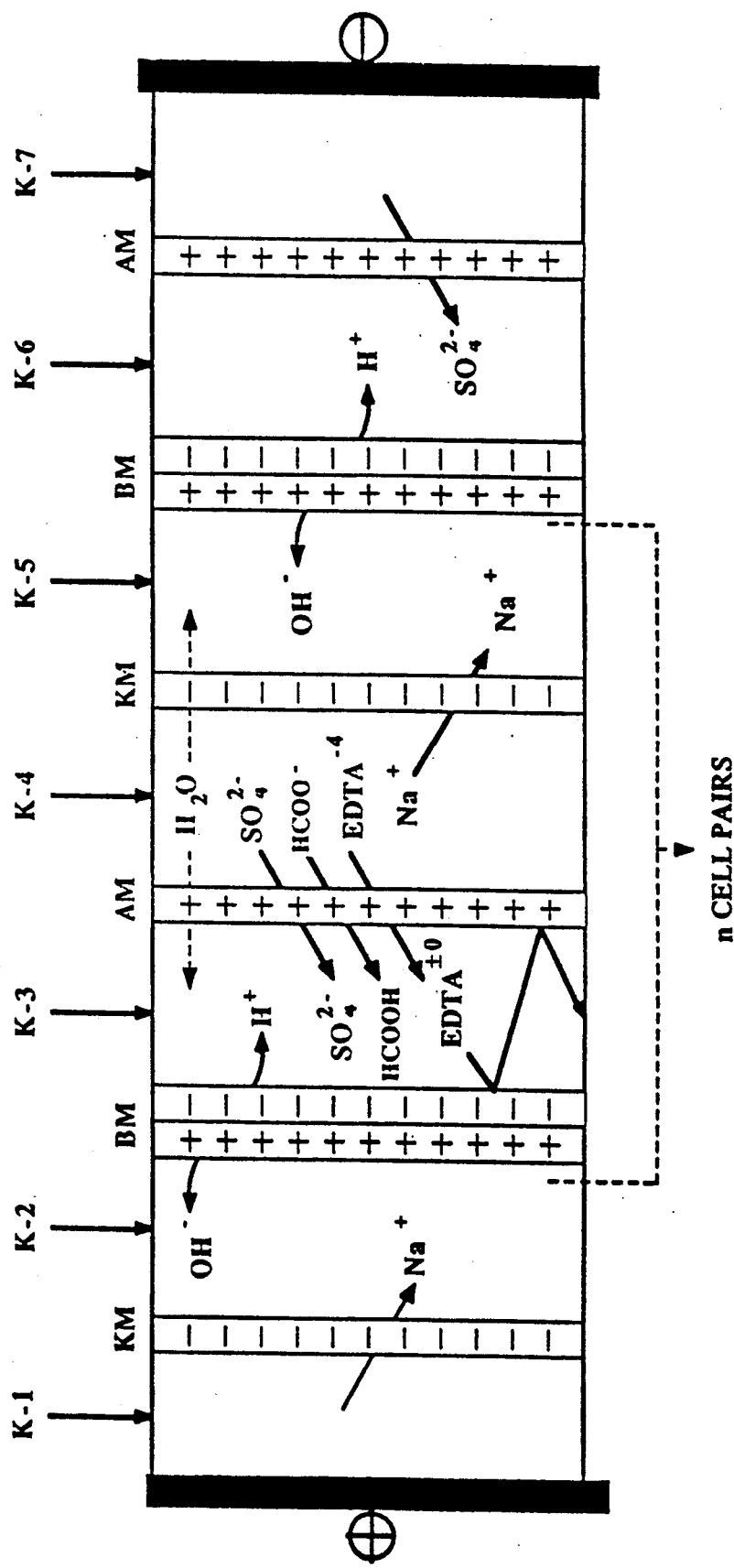
FIGS. 1 to 3 show those components of the specially developed electrodialysis cells EDZ1 which are essential for carrying out the method as disclosed by the present invention, as well as the reactions in the individual chambers.

The electrodialysis cell according to FIG. 1 comprises the following arrangement of anode (A), cathode (K), bipolar membranes (BM), anion exchange membrane (AM), cation exchange membranes (KM) and chambers (K1), with the anion-selective layer of the bipolar membranes facing the anode, and n representing values from 1 to 100.

A-K1-KM-K2-(BM-K3-AM-K4-KM-K5-)n BM-K6-AM-K7-K

Chamber K1 forms the anode section and is limited on the cathode side by a cation exchange membrane, chamber K2 is limited on the anode side by a cation exchange membrane and on the cathode side by a bipolar membrane, chamber K6 on the anode side by bipolar membrane and on the cathode side by an anion exchange membrane. Chamber K7 forms the cthoade section and is limited on the anode side by an anion exchange membrane. Chambers K3, K4 and K5 form one unit which exists n-times arranged in series, n being able to adopt the values 1 to 100, preferably the values 2 to 10. On the anode side chamber K3 is limited by a bipolar membrane and on the cathode side by an anion exchange membrane, chamber K4 is limited on the anode side by an anion exchange membrane and on the cathode side by a cation exchange membrane, chamber K5 on the anode side by a cation exchange membrane and on the cathode side by a bipolar memorane.

Figure 2:
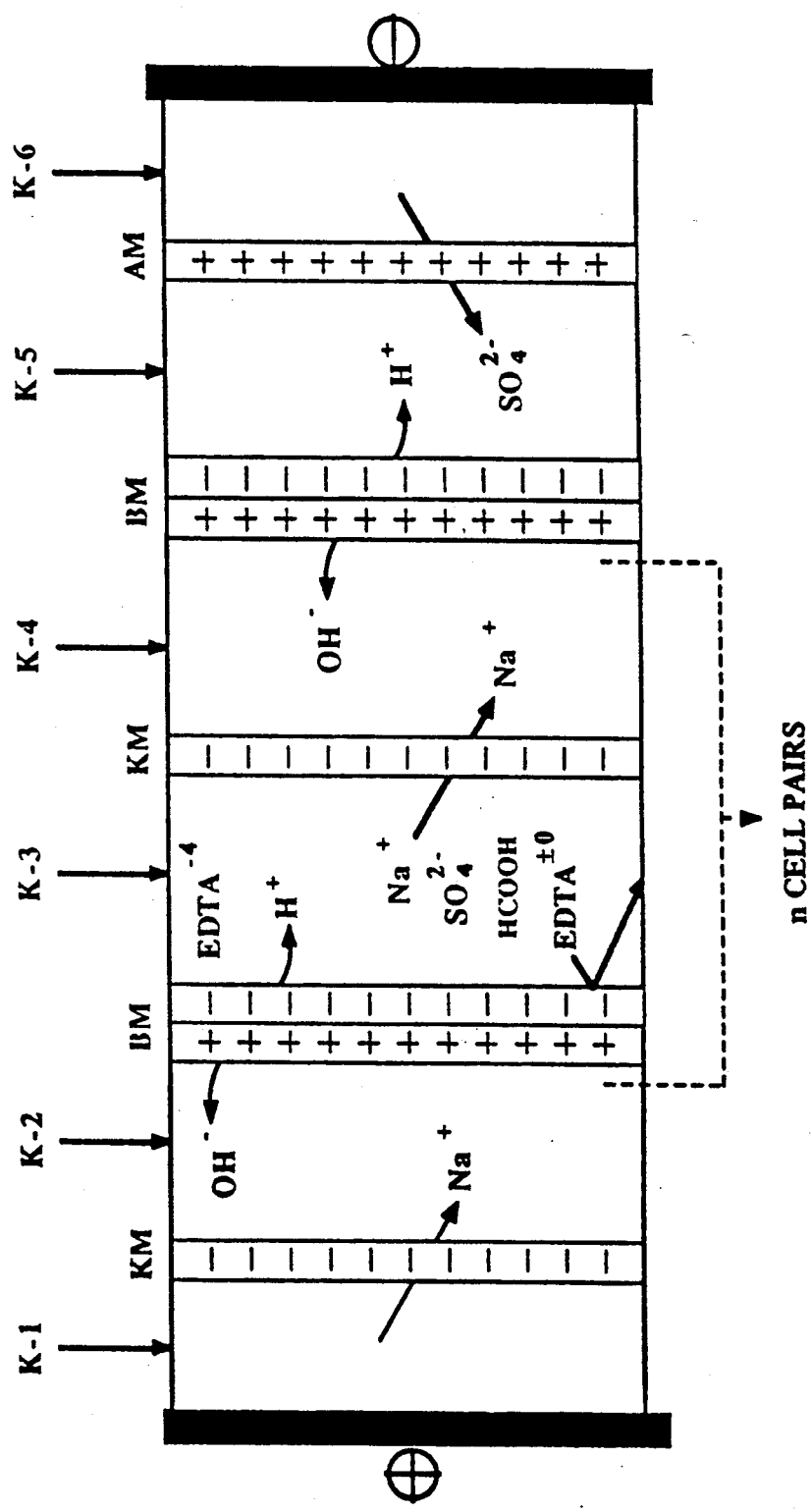

The electrodialysis cell according to FIG. 2 comprises the following arrangement of anode (A), cathode (K) bipolar membranes (BM), anion exchange membrane (AM), cation exchange membranes (KM) and chambers (K1), with the anion-selective layer of the bipolar membranes facing the anode, and n representing values from 1 to 100.

A-K1-KM-K2-(BM-K3-KM-K4-)n BM-K5-AM-K6-K

Chamber K1 forms the anode section and is limited on the cathode side by a cation exchange membrane, chamber K2 is limited on the anode side by a cation exchange membrane and on the cathode side by a bipolar membrane, chamber K5 on the anode side by a bipolar membrane and on the cathode side by an anion exchange membrane. Chamber K6 forms the cathode section and is limited on the anode side by an anion exchange membrane. Chambers K3 and K4 form one unit which exists n-times arranged in series, n being able to adopt the values 1 to 100, preferably the values 2 to 10. On the anode side chamber K3 is limited by a bipolar membrane and on the cathode side by a cation exchange membrane; chamber K4 is limited on the anode side by a cation exchange membrane and on the cathode side by a bipolar membrane.

Figure 3:
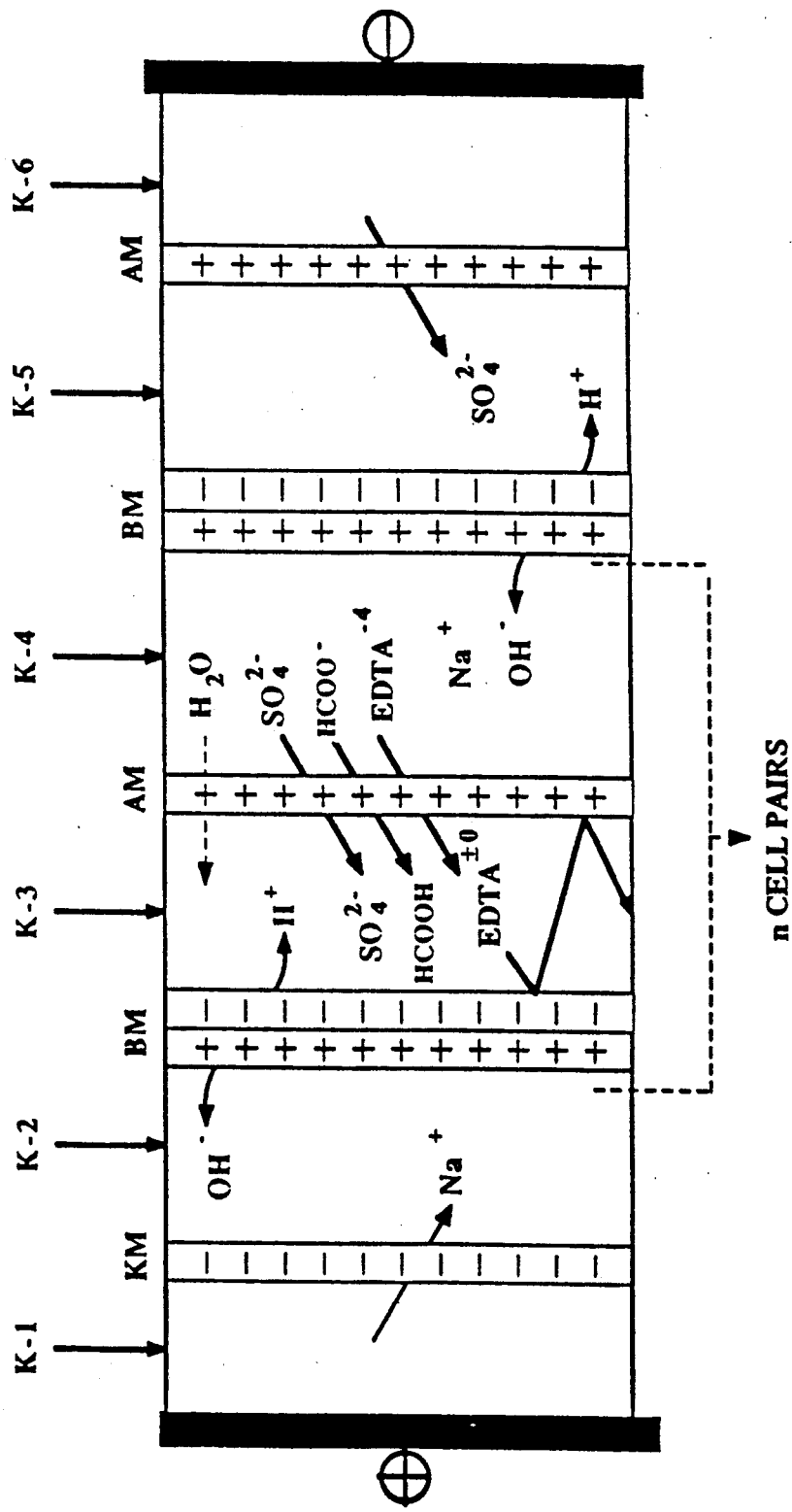

The electrodialysis cell according to FIG. 3 comprises the following arrangement of anode (A), cathode (K), bipolar membranes (BM), anion exchange membrane (AM), cation exchange membranes (KM) and chambers (K1), with the anion-selective layer of the bipolar membranes facing the anode, and n representing values from 1 to 100.

A-K1-KM-K2-(BM-K3-AM-K4-)n BM-K5-AM-K6-K

Chamber K1 forms the anode section and is limited on the cathode side by a cation exchange membrane, chamber K2 is limited on the anode side by a cation exchange membrane and on the cahtode side by a bipolar membrane, chamber K5 on the anode side by a bipolar membrane and on the cathode side by an anion exchange membrane. Chamber K6 forms the cathode section and is limited on the anode side by an anion exchange membrane. Chambesr K3 and K4 form one unit which exists n-times arranged in series, n being able to adopt the values 1 to 100, preferably the values 2 to 10. On the anode side chamber K3 is limited by a bipolar membrane and on the cathode side by an anion exchange membrane, chamber K4 is limited on the anode side by an anion exchange membrane and on the cathode side by a bipolar membrane.

The method as disclosed by the invention will be described below in detail by means of three embodiments with reference to FIGS. 1 to 3.

A first embodiment of the method as disclosed by the invention is as follows: after the copper ions have been removed from the process water, optionally by means of electrolysis, with a pH-value of 12.5 to 13, and unused formaldehyde has been oxidized into formic acid, the bath fluid shows a pH-value of 12.5 to 13 and comprises, apart from water, sulphate, formate, sodium and EDTA ions. Reference is also made to the reaction equation of p. 2. After this fluid has been directed into the chambers K4 of the electrodialysis cell EDZ1 the sulphate, formate and EDTA ions migrate, after the application of an electric DC field, through the anion exchange membranes into chamber K3, the sodium ions through the cation exchange membranes into chamber K5. Owing to the electric DC field applied an electrodialyticla water dissociation is effected via the bipolar mambranes, and from the bipolar membranes protons are directed into chambers K3 and K6, and hydroxyl ions into chamber K5. In chamber K3, with corresponding pH-values, the formate ions are protonated to formic acid, and the EDTA is converted into its charge-neutral form. With pH-values form 3.3 onward a beginning crystallization of the charge-neutral EDTA becomes visible, with the EDTA contents of the supernatant solution reaching its minimum with a pH-value of 1.7 only. In chamber K5, sodium hydroxide is formed of the sodium ions of chamber K4 and of the hydroxyl ions from the bipolar membranes. Chamber K1 contains as anolyte sodium sulphate or sodium hydroxide, chamber K7 contains as catholyte sodium sulphate or sulphuric acid. Through the cation exchange membrane sodium ions migrate from chamber K1 into chamber K2 and form sodium hydroxide with the hydroxyl ions from the bipolar membrane. Through the anion exchange membrane sulphate ions migrate from chamber K7 into chamber K6 and form sulphuric acid with the protons from the bipolar membrane. From chamber K4 purified process water is removed and from chamber K3 a suspension from which by means of filtration pure EDTA can be isolated. From chambers K2 and K5 pure sodium hydroxide can be obtained and from chamber K6 pure sulphuric acid, both being readded in the cycle of chambers K1 and K7. A continuous processing has thus become possible.

A second embodiment of the method as disclosed by the invention is as follows: after copper ions have been removed from the spent bath, optionally by means of electrolysis, with a pH-value of 12.5 to 13, and unused formaldehyde has been oxidized into formic acid, the bath fluid shows a pH-value of 12.5 to 13 and apart from water comprises sulphate, formate, sodium and EDTA ions. Reference is also made to the reaction equation of page 2. After this fluid has been directed into the chamber K3 of the electrodialysis cell EDZ1 the sulphate, formate and EDTA ions migrate, after the application of an electric DC field, through the cation exchange membranes into chamber K4. Owing to the electric DC field applied an electrodialytical water dissociation is effected via the bipolar membranes, and from the bipolar membranes protons are directed into chamber K3 and into chamber K5, and hydroxyl ions into chamber K4 and into chamber K2. In chambers K3, with corresponding pH-values, the formate ions are protonated into formic acid, and the EDTA is converted into its charge-neutral form. With pH-values from 3.3 onward, a beginning crystallization of the charge-neutralized EDTA becomes visible, with the EDTA contents of the supernatant solution reaching its minimum with a pH-value of 1.7 only. In chamber K4, sodium hydroxide is formed of the sodium ions of chambers K3 and of the hydroxyl ions from the bipolar membrans. Chamber K1 contains as an anolyte sodium sulphate or sodium hydroxide; chamber K6 contains as catholyte sodium sulphate or sulphuric acid.

Through the cation exchange membrane sodium ions migrate from chamber K1 into chamber K2 and form sodium hydroxide with the hydroxyl ions from the bipolar membrane. Through the anion exchange membrane sulphate ions migrate from chamber K6 into chamber K5 and form sulphuric acid with the protons from the bipolar membrane. From chamber K3 a suspension is removed from which by means of filtration pure EDTA can be isolated. From chambers K2 and K4 pure sodium hydroxide can be obtained and from chamber K5 pure sulphuric acid, both being readded inthe cycle of chambers K1 and K6. A continuous recycling has thus become possible.

A third embodiment of the method as disclosed by the invention is as follows: after copper ions have been removed from the spent bath, optionally by means of electrolysis, with a pH-value of 12.5 to 13, and unused formaldehyde has been oxidized to formic acid, the bath fluid shows a pH-value of 12.5 to 13 and apart from water comprises sulphate, formate, sodium and EDTA ions. Reference is also made to the reaction equation of page 2. After this fluid has been directed into the chamber K4 of the electrodialysis cell EDZ1 the sulphate, formate and EDTA ions migrate, after the application of an electric DC field, through he anion exchange membranes into chamber K3. Owing to the electric DC field applied an electrodialytical water dissociation is effected via the bipolar membranes, and from the bipolar membranes protons are directed into chamber K3 and into chamber K5, and hydroxyl ions into chamber K4 and into chamber K2. In chamber K3, with corresponding pH-values, the formate ions are protonated to formic acid, and the EDTA is converted into its charge-neutral form. With pH-values from 3.3 onward, a beginning crystallization of the charge-neutral EDTA becomes visible, with he EDTA contents of the supernatant solution reaching its minimum with a pH-value of 1.7 only. In chamber K4, sodium hydroxide is formed of the sodiu mions of chamber K3 and of the hydroxyl ions from the bipolar membranes. Chamber K1 contains as an anolyte sodium sulphate or sodium hydroxide; chamber K6 contains as catholyte sodium sulphate or sulphuric acid. Through the cation exchange membrane sodium ions migrate from chamber K1 into chamber K2 and form sodium hydroxide with the hydroxyl ions from the bipolar membrane. Through the anion exchange membrane sulphate ions migrate from chamber K6 into chamber K5 and form sulphuric acid with the protons from the bipolar membrane. From chamber K3 a suspension is removed from which by means of filtration pure EDTA can be isolated. From chamber K2 pure sodium hydroxide can be obtained and from chamber K5 pure sulphuric acid, both being readded in the cycle of chambers K1 and K6. A continuous recycling has thus become possible.

In order to arrive at a self-regulating system, and to perform a continuous disposal and recoveyr of the EDTA, an important feature of the method as disclosed by the invention is the pH-adjustment in chamber K3 of the electrodialysis cells EDZ1 in accordance with FIGS. 1 to 3 by means of a pH-controlled electric field regulation via the bipolar membranes. For that purpose, the electrode of a pH measuring device is provided in chambers K3 of the electrodialysis cells EDZ1 of FIGS. 1 to 3, and this measuring device is connected to a computer which controls a voltage regulator. Thus the potential difference applied to the electrodialysis cells EDZ1 is controlled as a function of the pH-value in chambers K3, and thus the pH-value in chambers K3 is controlled via the bipolar membranes. The respective pH-value for converting the EDTA into its charge neutralized form can thus be set accordingly.

Figure 4:
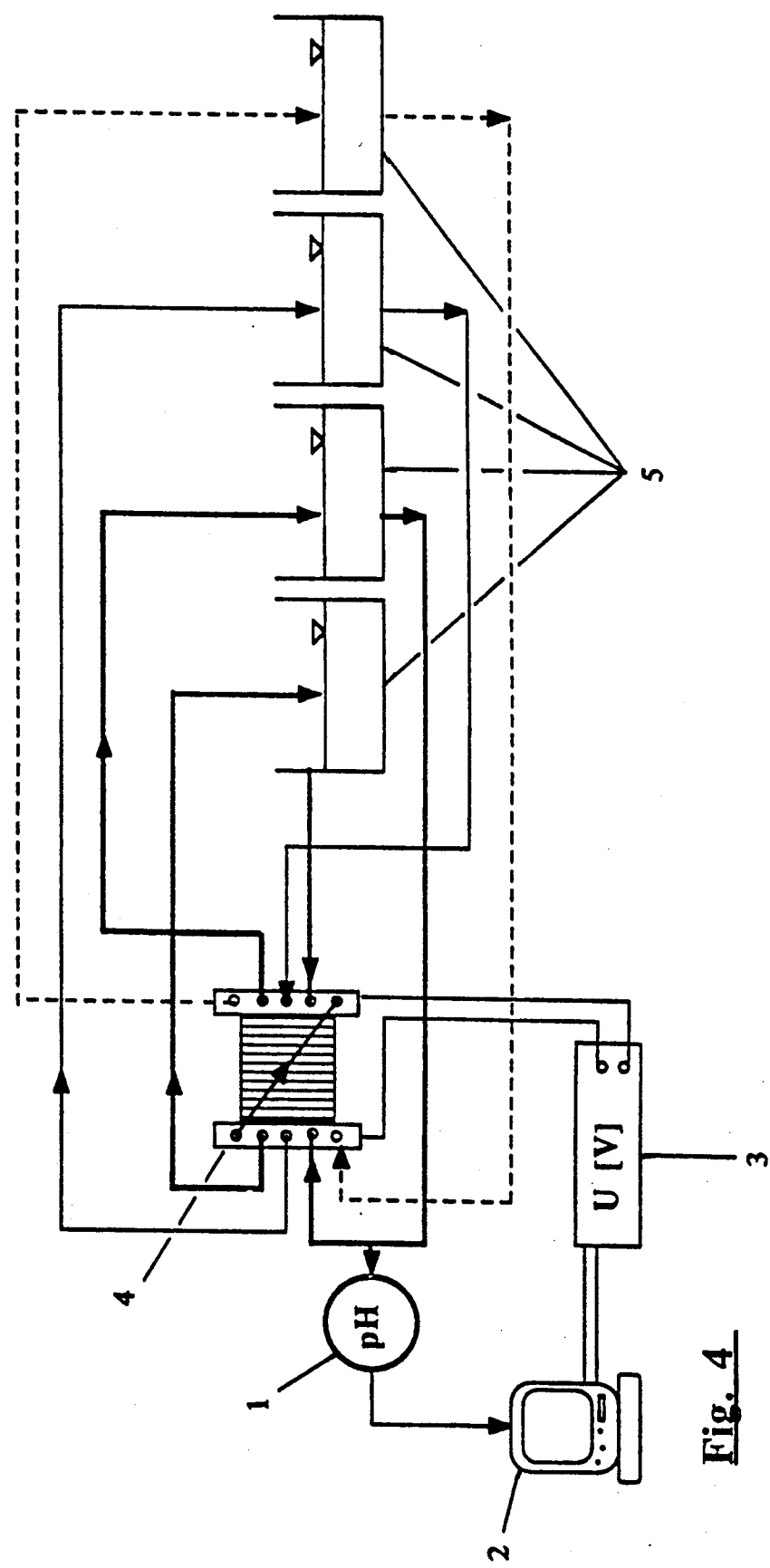
FIG. 4 depicts an arrangement of electric field regulation.

FIG. 4 depicts an arrangement of this electric field regulation, with (1) representing the pH measuring device, (2) the computer, (3) the voltage regulator, (4) the electrodialysis cell, and (5) the rinsing containers for the chambers of the electrodialysis cells. Without restricting the invention, the electrodialysis cells EDZ1 are operated, for carrying out the method as disclosed by the invention with current densities from 1 to 150 mA/cm$^2$, preferably with 2 to 10 mA/cm$^2$.

For the electrodialysis cells EDZ1 for carrying out the method as disclosed by the invention commercially available cation and anion exchange membranes can be used. Examples for cation exchange membranes are NEOSEPTA ® CL-25 T, NEOSEPTA ® CMS (Tokuyama Soda Co., Japan) and SELEMION CMV (Asahi Glass Co., Japan). Examples for anion exchange membranes are NEOSPETA ® ACH-45 T, NEOSEPTA ® AMS, SELEMION ® AMV, SELEMION ® AMP and SELEMION ® AMF. In the electrodialysis cells for carrying out the method as disclosed by the invention, the anode section is limited by acation exchange membrane and the cathode section by an anoin exchange membrane. Without restricting the invention, exchange membranes of the type NEOSEPTA ® CMX and AMX of Tokuyama Soda Co., Japan, are preferably used here. Without restricting the invention, anion exchange membranes of the type NEOSEPTA ® ACM, NEOSPETA ® AFN or NEOSEPTA ® AM-3 are preferably used for the cell stack, and cation exchange membranes of the type NEOSEPTA ® CMS or NEOSEPTA ® CM02.

As bipolar membranes laminates of two ion-selective films of opposite polarity can be used which can be obtained by placing together two commercially available cation and anion exchange membranes, or functionalized composite films with cation and anion-selecive characteristics on both sides of the membrane. For their production, reference is made to the article "Development of Bipolar Membranes" by B. Bauer, F. J. Gerner and H. Strathmann in Desalination, 68, 279–292, 1988.

In order to release the EDTA from the complex it may be advisable in some cases electrolytically to remove the copper ions from the process waters prior to their processing in accordance with the method as disclosed by the invention, i.e. prior to their introduction into the electrodialysis cells EDZ1.

Figure 5:
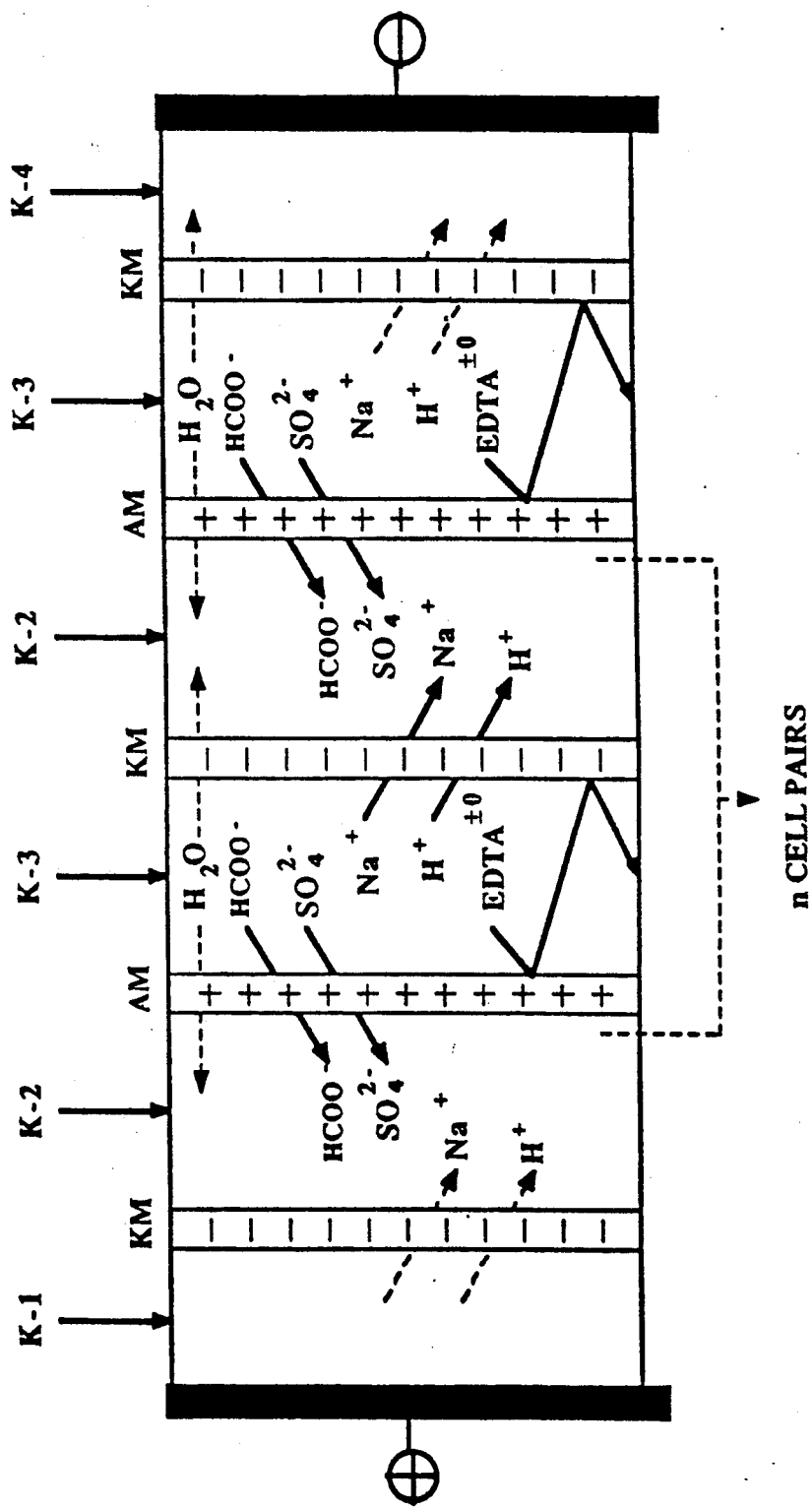
FIG. 5 shows an electrodialysis cell EDZ2.

Depending on each respective case it may be advisable, after the separation of the charge-neutral EDTA in the EDZ1, i.e. after the addition of the mineral acid (preferably sulphuric acid), to direct the remaining fluid which still contains EDTA in the order of 1,000 ppm through a second electrodialysis cell EDZ2 which is alternatively equipped with anion and cation exchange membranes. FIG. 5 shows such an electrodialysis cell EDZ2. It includes the following arrangement of anode (A), cathode (K), anion exchange membranes (AM), cation exchange membranes (KM), and chambers K1, with n being able to adopt values between 1 and 100. Cells with values for n between 2 and 10 are preferred.

A-K1-KM-K2-(AM-K3-KM-K2-)n AM-K3-KM-K4-K

Without restricting the invention, the electrodialysis cells are preferably operated with current densities between 5 and 30 mA/cm$^2$.

In the electrodialysis of the remaining solution there is, with a pH-value of about 1.7, a transport of the sulphate and formate ions into the so-called concentrate cycle (chambers K2) and a simultaneous retention of the EDTA in the diluate cycle (chambers K3). This leads towards a slow enrichment of the EDTA in the fluid, which is further intensified by an electro-osmotic water transport from the diluate to the concentrate cycle, and which initiates a further EDTA precipitation. The EDTA-free fluid in the concentrate cycle can be directed into sewage, optionally by inserting further conventional cleaning stages, whereas the EDTA containing fluid form the diluate cycle is advantageously combined again with the fluid remaining after EDTA precipitation (see above).

It has thus been made possible by the method as disclosed by the invention, optionally in combination with further process steps like the electrolytic pre-cleaning and/or the electrodialytic supplementary cleaning, continously to remove and to obtain EDTA from copper plating baths, and to purify the process water in such a manner that it can either be directed into sewage direct, or recycled into the process.

We claim:

1. Method of continously removing and obtaining ethylene diamine tetraacetic acid (EDTA) from the process water of electroless copper plating by means of EDTA protonation, characterized in that the process water containing the EDTA is directed into a first electrodialysis cell which is alternatively equipped with bipolar membranes and ion exchange membranes, and to which a potential difference is applied, that the EDTA is converted into its charge-neutral form, that the protons required for that process are generated via bipolar membranes by means of electrodialysis, and that the required pH-value is adjusted through a pH-controlled electric field regulation via the bipolar membranes.

2. Method as claimed in claim 1, characterized in that the EDTA existing as an anion is separated from the process water prior to protonation via an anion exchange membrane through electrodialysis, and transported into a chamber limited by a bi-polar membrane and by the anion exchange membrane.

3. Method as claimed in claim 1, characterized in that cations are removed from the process water through electrodialysis via a cation exchange membrane.

4. Method as claimed in claim 1, characterized in that the first electrodialysis cell is operated with a current density of 1 to 150 mA/cm$^2$.

5. Method as claimed in claim 4, characterized in that the first electrodialysis cell is preferably operated with a current density of 2 to 20 mA/cm$^2$.

6. Method as claimed in claim 1, characterized in that the fluid containing the charge-neutral EDTA is directed through a second electrodialysis cell which is alternatingly equpped with anion and cation exchange membranes, and that the remaining ions are removed by electrodialysis.

7. Method as claimed in claim 1, characterized in that prior to protonation the copper ions are electrolytically removed from the process water.

8. Method as claimed in claim 7, characterized in that during protonation the pH value of the solution is lowered to a value between about 0.9 and about 2.2.

9. Method of continuously removing and obtaining ethylene diamine tetraacetic acid (EDTA) from the process water of electroless copper plating by means of EDTA protonation, characterized in that the process water containing the EDTA is acidified with mineral acid in a manner known per se, and the precipitated EDTA is filtered off, and the remaining fluid is subsequently directed through a second electrodialysis cell alternatingly equipped with anion and cation exchange membranes, and that the EDTA is separated from the remaining ions in the fluid by means of electrodialysis.

10. Method as claimed in claim 6 or 9, characterized in that the second electrodialysis cell is operated with a current density of 5 to 30 mA/cm$^2$.

11. Method as claimed in claim 7, characterized in that the pH value of the solution is lowered to a value of about 1.7.

* * * * *